United States Patent
De Palma et al.

[15] 3,682,530
[45] Aug. 8, 1972

[54] POLYMERIC REAR PROJECTION SCREENS

[72] Inventors: James J. De Palma; Edward D. Morrison; Robert F. Williams, all of Rochester, N.Y. 14650

[73] Assignee: Eastman Kodak Company, Rochester, N.Y.

[22] Filed: Sept. 24, 1970

[21] Appl. No.: 75,284

Related U.S. Application Data

[60] Division of Ser. No. 838,528, July 2, 1969, which is a continuation-in-part of Ser. No. 823,233, April 2, 1969, abandoned.

[52] U.S. Cl. ..................350/126, 161/3.5, 264/1
[51] Int. Cl. ..........................................G03b 21/56
[58] Field of Search.....350/117, 126; 161/3.5; 264/1

[56] References Cited

UNITED STATES PATENTS

| | | |
|---|---|---|
| 2,287,556 | 6/1942 | Land..........................350/126 |
| 3,372,971 | 3/1968 | Quackenbush............350/117 |

FOREIGN PATENTS OR APPLICATIONS

| | | |
|---|---|---|
| 769,422 | 10/1967 | Canada....................350/126 |

*Primary Examiner*—Samuel S. Matthews
*Assistant Examiner*—Richard M. Sheen
*Attorney*—Walter O. Hodsdon and John T. Lewis

[57] ABSTRACT

A rear projection screen comprising a sheet of polymeric material consisting essentially of polypropylene. The sheet comprises two surface layers and a core layer containing crystalline spherulites. The core layer contains larger spherulites than the two surface layers.

2 Claims, 2 Drawing Figures

PATENTED AUG 8 1972 3,682,530

JAMES J. DePALMA
INVENTOR.
BY John T. Lewis
Walter O. Hodsdon
ATTORNEYS

POLYMERIC REAR PROJECTION SCREENS

This application is a division of U.S. Pat. Application Ser. No. 838,528, filed July 2, 1969, which in turn is a continuation-in-part of U.S. Pat. Application Ser. No. 823,233, filed Apr. 2, 1969 (now abandoned).

The present invention relates to polymeric rear projection screens and to special processes for their manufacture. More particularly, this invention relates to rear projection screen materials made mainly of polypropylene.

The widespread usefulness of rear projection screens has been well established in equipment which generally features the projection of an image from a section of microfilm, usually through a group of lenses and reflected by one or more mirrors, against that surface of a screen which is opposite from the side of the screen being viewed. Typical examples of such rear projectors are featured in the Lodestar and Starlet lines of viewers sole by Eastman Kodak Company.

Screens have been constructed heretofore in many different ways of many different types of materials. For example, etched glass screens or glass screens which are coated with some material to make the screens opaque have been popular for many years. However, glass materials are prone to breakage. Plastic or waxy materials are not so subject to breakage as is glass, and have become more widely used recently. Micro-crystalline wax has been suggested for use as screen material. Examples of plastic or polymeric screens that are conventionally available include laminated materials (wherein a darkened opaque dye-containing layer is laminated to one surface of clear, rigid plastic), as well as solid, unitary polymeric sheeting of various kinds (such as polyethylene). However to date, conventional materials have suffered from one or more major shortcomings; relating mainly to the various transmittance properties or optical elements that are considered important by users of equipment which contains rear projection screens.

The evaluation of rear projection screens can be described in terms of four separate, distinct, optically appreciative elements; namely, in terms of (1) "contrast", (2) "brightness", (3) "scintillation" and (4) "hot spot". An ideal rear projection screen has practically no "hot spot" (an area on the screen which is distinctly brighter than the remainder of the screen), practically no "scintillation" (the appearance of tiny, sparkling spots over the surface of the screen), maximum contrast and high brightness. Of these "elements", the elimination of "hot spots" and "scintillation" are of perhaps primary importance. One method for determining the relative merits and the relative acceptability of a given rear projection screen material is to separately evaluate the material for each of these four major "elements" in a somewhat subjective manner as follows.

A method by which the relative merits and acceptability of a given rear projection screen material can be evaluated for each of the aforementioned characteristics in a somewhat subjective manner is to assign a progressive numerical value for each of the characteristics. For example, if a value of 0–9 assigned to each characteristic with a rating of 0 being indicative of the very poorest quality and a rating of 9 being indicative of the best possible quality, then the evaluated numerical rating for each of the four characteristics can be added together to determine a particular quality or "Q rating" for any given screen material. Such evaluations are assigned when a material is tested under actual conditions by projecting an image on the screen in a conventional manner. By this method a theoretically perfect screen would have a "Q rating" of 36 and a screen of inferior quality would have a correspondingly lower "Q rating". This method, as described above, is not all inclusive because it relies on an individual's visual analysis which can and will vary from person to person. However, the method does provide a way of evaluating the characteristics of different screen materials so that at least a subjective comparison can be made. A more practical "Q rating" might be obtained, if the same evaluations were made by several persons and then averaged.

A conventional rear projection screen (A) comprising a glass plate coated with a wax diffusing layer has a "Q rating" of 24 which was determined as follows:

| screen | hot spot | scintillation | contrast | brightness | Q rating |
|---|---|---|---|---|---|
| A | 9 | 2 | 8 | 5 | 24 |

This evaluation shows that the screen scintillates considerably and that the image is not particularly bright. While one evaluation might give a high "Q rating", another might give a lower rating, such that an average can be obtained. The average becomes more meaningful as the number of evaluations by different people of the same screen is increased. Several other commercially-available screens have been rated by this method as follows:

| screen | hot spot | scintillation | contrast | brightness | Q rating |
|---|---|---|---|---|---|
| B | 7 | 8 | 9 | 4 | 28 |
| C | 9 | 2 | 9 | 4 | 24 |

By comparison, a rear projection screen of the present invention was evaluated as follows:

| screen | hot spot | scintillation | contrast | brightness | Q rating |
|---|---|---|---|---|---|
| I | 7 | 8 | 9 | 7 | 31 |

From the "Q ratings" and individual "element" evaluations set out above for the conventional screens (A, B and C), it can be appreciated that in each instance, the commercially available rear projection screen had at least one major shortcoming, which, in fact, detracted significantly from its overall desirability as a rear projection screen. These are typical data for conventional rear projection screens. Rear projection screens having significantly better overall performance than these simply have not been available heretofore. The goal for a significantly improved rear projection screen that would provide widespread acceptability is to rate at least 7 in every one of the four "elements", and a total "Q rating" of at least 28.

DESCRIPTION OF THE DRAWING

Reference is now made to the accompanying drawing in which.

Figure 1:
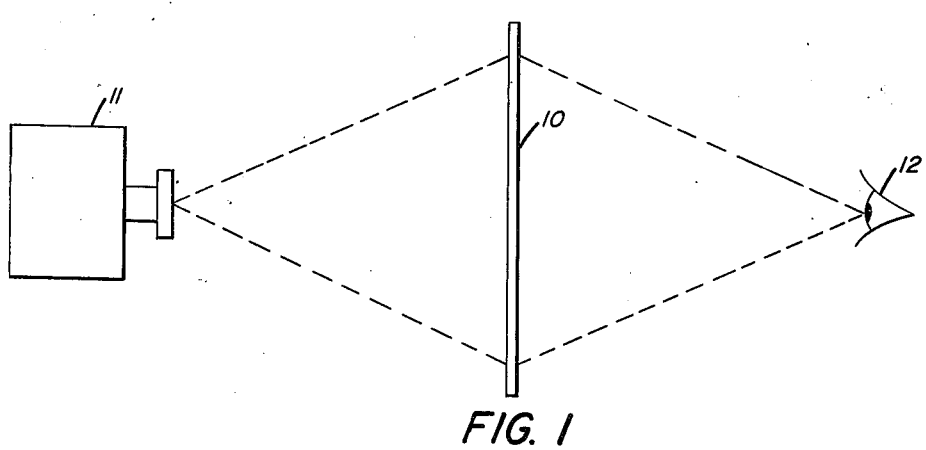
FIG. 1 is a schematic view showing the arrangement of a rear projection screen relative to a projector.
Figure 2:
FIG. 2 is a vertical section, greatly magnified, taken through a sheet of polypropylene produced in accordance with the present processes.

It is a major object of the present invention to provide a rear projection screen material that is both relatively inexpensive and very high quality, and meets all of the requirements set out above for an improved rear projection screen material.

It has been discovered that this object, as well as many others, can be achieved by subjecting molten polypropylene to a special process involving carefully cooling a sheet of polypropylene to induce a particular type of crystal formation through the cross-section of the sheet. Thus, in the generic processes of this invention, (a) molten polypropylene is cast or extruded in the form of a fairly thick sheet onto a heat transfer surface maintained at a temperature which is sufficiently low to cause the surface of the molten sheet to solidify, but not so cool as to cause the entire sheet to solidify, and (b) thereafter maintaining the surfaces of the sheet at a temperature of from about 85° C to about 160° C (to thereby keep the rate of loss of heat from the "core" thereof relatively low and to induce growth of many crystals in the "core") until at least the center three-fourths (measured through the thickness of the sheet) becomes highly crystalline. Generally, the heat transfer surface referred to in (a) should be maintained at a temperature of from about 85° C to about 170° C, and preferably from about 90° C to about 150° C, just prior to the initial contacting. In a preferred embodiment of this invention, at some stage in these processes, one surface of the sheet is roughened to about 10–30 microinches. This further increases diffusion and also eliminates reflection on the viewed surface from room or background lights. The resulting sheet can be used directly as a rear projection screen.

Any crystalline structure or portion of the present polymeric screens having uniform optical properties or qualities, such as a spherulite, will sometimes be referred to herein as a "domain". Accordingly, a discrete spherulite (which can readily be identified as such by viewing a cross section of a polymeric screen under polarized light) is a "domain" in this context.

Evidently it is the unique combination of variously sized spherulite crystalline domains in the sheet, ranging from relatively fewer and smaller crystals at the relatively uncrystallized outer surfaces of the resulting solid poly-propylene sheets to relatively larger spherulite crystals in the highly crystallized inner "core", that produces the proper degree and type of light diffusion and very high "Q ratings" of the projection screens of the present invention. Although the exact quantitative lower ratio of less crystalline "outer" material to highly crystalline "core" material in these screens is apparently not critical with respect to the successful practice of this invention, it is believed necessary that the highly crystalline "core" fraction represent at least about three-fourths of the total thickness of the polypropylene sheet. The relative thickness of this highly crystalline "core" fraction can readily be determined by observing a cross-section of the sheet under a microscope, or in any of a number of other well known ways. Under the microscope, set at 150X, for example, the largest polypropylene crystalline spherulite in the "core" are found to have diameters of from about 15 TO ABOUT 45 MICRONS (and preferably from about 20 to about 40 microns) measured at their widest point, with smaller crystals at the surfaces of the screen material having maximum diameters generally of at most about 10 microns. It should be noted that both the "core" and the edge portions of the polymeric sheets of this invention contain a wide range of crystallite sizes, and the foregoing measurements relate to the larger ones only. Apparently the valuable optical properties of such screen materials are due to the unique arrangement (and relative proportions) of regions of crystalline and relatively amorphous polypropylene in the sheets, as well as the sizes and types of crystals involved in those regions. Thus, in such sheets, there is a central "core" of almost totally crystallized polypropylene (which "core" is at least three-fourths of the thickness of the sheets). On either side of this "core" there is a layer of apparently relatively less crystallized polypropylene (in a sandwich like arrangement) with the less crystallized layers being at the surfaces of the sheets (which sheets in turn are from about 20 to about 80 mils thick, and preferably are from about 25 to about 60 mils thick). The entire screen, however, is composed of at least about 60 weight percent (preferably from about 70 to about 90 percent) of spherulite structures having average diameters (measured at their widest point) of from about 5 to about 20 microns. The larger spherulite crystals in the "core" of such valuable polypropylene rear projection screen materials have diameters of from about 15 to about 45 microns (preferably from about 20 to about 40 microns) at their widest point. The largest crystals in the outer, less crystalline "sandwich" layers at the sheet surfaces are almost invariably smaller than 10 microns in diameter.

In order to obtain the unique rear projection screen materials described above, it has been found that the various important elements of the processes of the present invention must be carefully followed. Thus, if the molten polypropylene is cast initially onto a heat transfer surface which is too cold, or if the partially solidified material is permitted to remain against a relatively cool heat transfer surface too long, that portion of the resulting sheet containing the smaller crystals evidently becomes too large, and may even completely fill the sheet. This produces a screen with insufficient diffusion so that the projector bulb is visible ("hot spot") through the screen. Conversely, if the initial contact of the molten polymer with the first heat transfer surface is too short, or if the temperature of the heat transfer surface is too high, the outer surfaces of the sheet will not solidify sufficiently. This leads to buckling and sheet distortion. In addition, on cooling, the sheet tends to be brittle because of the very large percentage of highly crystalline "core" material containing substantially larger spherulite crystals, on average, than has been found necessary for the successful practice of this invention. In summary, both rapid cooling and excessively slow cooling are unsatisfactory since one produces too small crystals through too much of the sheet and the other produces too large crystals through the "core" of the sheet. A desirable screen, on the other hand, has a heterogeneous structure with a range of various crystal sizes, with a "core" of relatively larger crystals and outer layers of considerably smaller crystals, the larger spherulite crystals in the "core" being from about 15 to about 45 microns in diameter, measured at their widest point.

During the crystallizing step (which must begin within a few seconds; preferably within about 10 seconds of the time the sheet is originally cast) the objective is to permit the "core" of the sheet to cool at a sufficiently slow rate to encourage the formation of crystals having the proper size through at least the center three-fourths (preferably nine-tenths) of the sheet. (Although total crystallization in this "core" layer probably cannot be expected, detailed inspection of the sheet reveals that the "core" is practically entirely crystalline.) This objective can be attained by passing the sheet through a warm area in which the surfaces of the sheet are maintained at a temperature of from about 90° C to about 160° C (preferably from about 90° C to about 125° C) until the desired, largely crystalline "core" (of properly sized crystals) is formed. This carefully controlled crystallizing step can generally be accomplished in from about 2 to about 10 minutes, the determining factor, insofar as the maximum amount of time is concerned, being the necessity to maintain the crystals at the outer surfaces of the sheet in the relatively smaller size (and generally relatively less densely distributed through these outer layers, as compared with the "core" material).

The particular mechanical and manipulative manner in which the aforesaid process is carried out is not critical in sofar as the successful practice of this invention is concerned. For example, the initial "surface cooling" step can be accomplished by passing the layer of molten polymer between two relatively cool rolls, set sufficiently far apart to yield a sheet of the desired thickness. Or the sheet can be extruded onto one relatively cool roll while, simultaneously, relatively cool air is directed at the outer surface of the sheet (to aid in initially "setting" the outer portion of the sheet). Alternatively, the molten polymeric material can be directed between metal sheets whose surfaces are maintained with the proper temperature spectrum. Practically immediately after the "surface cooling" step, the sheet can then be directed into an area in which both the gas surrounding the sheet and the surfaces of the sheet itself are maintained at temperatures within the range of from about 90° C to about 140° C. This can be accomplished in an area where, while the sheet is transported over a series of idler rolls, electric heaters continuously or intermittently apply heat to either one or both surfaces of the slowly cooling sheet.

When a rough surface on the sheet is desired, the particular point at which the roughness is applied to one surface of the sheet is not critical. It can be impressed thereon by, for example, one or more of the rolls with which the relatively soft sheet is brought into contact during, or even prior to, the "crystallizing" step described above. Or the roughness can be applied if desired in a separate, subsequent step in which the sheet is embossed with the necessary degree and type of roughness in a press under pressure. In any event, the type and amount of roughness that is applied to one surface of a particularly preferred screen material of this invention is for the purpose of increasing diffusion and also for eliminating surface reflections caused by room or other background lighting. Consequently, when the screen material is mounted into an appropriate apparatus, the rough surface should be toward the person viewing the screen. Because it is for this purpose, the surface roughness should be fairly uniform over the surface of the screen, and should be from about 10 to about 30 microinches (as measured by use of a commercial surface roughness analyzer such as the "Berdix Proficorder"). If the surface is smoother than 10 microinches, reflection will not be eliminated and above about 35 microinches the surface becomes too rough and is visually unacceptable to the close observer. (For more distant viewing, a higher degree of roughness than about 35 microinches can be used.) The roughness should be random in nature such as is obtained by sandblasting, etching or plating. If a uniform pattern is applied such as by embossing, objectionable scintillation is often produced.

Still another very important aspect of the present invention relates to the thickness of the screen material. Data accumulated to date indicates that the screen material must be from about 20 to about 80 mils in thickness. Thinner gauge materials apparently either cannot be processed in such a way as to yield the sheet material of this invention, or its resulting properties are such that an acceptable, high "Q rating" cannot be obtained therefrom. Conversely, sheets thicker than about 80 mils have a similar disadvantage in that acceptable, high "Q ratings" apparently cannot be obtained by their use either. Evidently, it is the overall unique balance of thickness, of opacity due to crystallite form crystallite number and crystallite size, and of the peculiar property of polypropylene sheets of the prescribed thickness to transmit clear images that are not discolored in any way, that makes possible the valuable results that can be obtained by practicing this invention. That the sheets of the present invention transmit colored images with an exceptionally high degree of color integrity is still another surprising advantage that can be obtained by practicing this invention.

EXAMPLES

Using conventional equipment throughout, a sheet of polypropylene having a melt viscosity of 2.5 and a density of 0.90 grams per cubic centimeter is extruded at a temperature of 220° C directly onto the surface of a steel roll, which surface is maintained at 90° C. The thickness of the sheet is 30 mils. The temperature of the air surrounding the roll is maintained at 93° C. The diameter of the cool roll is 2.5 inches, and the sheet is cast continuously at a rate of 3 ft. per minute. The total amount of time during which the extruded sheet is maintained in contact with the surface of the cool roll is 9 seconds, this time being sufficient to cause the surface of the sheet to "set up", thereby forming thin layers of polypropylene of low crystallinity at both surfaces of the sheet. The sheet is then passed onto the surface of a second roll of the same type and maintained under the same conditions. Upon leaving the surface of the second of these relatively cool rolls the sheet is dropped into a vertical chamber in which the air temperature is maintained at 93° C. The surface of the sheet and the air surrounding the sheet are maintained at about this temperature for a total of 90 seconds by passing the sheet before a series of electric heaters mounted along the rolls of the chamber. During the period of time in which the sheet is passed through the vertical chamber, an extensive translucency is observed developing in the sheet. This results from the formation of a multiplicity of the relatively larger crystal of the necessary size in the "core" of the sheet. The sheet is then removed from the chamber and cooled under ambient conditions to room temperatures, at which point it is cut into individual sheets, which in turn are pressed in a conventional hydraulic press under a pressure of 140 psi between one very smooth steel plate and one steel model plate having the desired roughened surface of 25 microinches. The resulting sheet yields a "Q rating" of 31. When tested in a conventional rear projection apparatus, in which microfiches recorded on a sheet of colored transparent film are used, it is observed that this screen transmits a very sharp image which is not only very free of undesirable haze but is also a true rendition of the colored material on the original microfiche.

It has been found that the polypropylenes that can be used successfully in the practice of this invention are those having a melt flow rate (measured in dg/min. at 230° C under 2.16 kg. load; A.S.T.M. standard test D 1238) of below about 90, preferably between about 1.5 and about 10. Other materials that do not detract substantially from the crystallite distribution and sizes described hereinbefore can also be present in the screen materials of this invention. For example, the presence of finely divided starch, calcium carbonate, and the like can actually impart still further improvements in the "Q ratings" of such screens. Also, when the screens are to be used to read negative materials for any extended period of time, it is preferable to view the negative materials through a relatively darker, neutral density colored layer. Thus, in a special adaptation of this invention, sufficient neutral density dye (or combination of dyes) can be either added to the polypropylene (or coated on the screen material) in amounts sufficient to produce an increase in diffuse density in the resulting composition of as much as 0.1 or more. Alternatively, a thin, transparent, neutral density dyed, polymeric film can be utilized in combination with the special screen material described above, if desired. (In this instance, the surface of the screen material facing the person using the viewer need not be roughened, but one surface of the neutral density film material can be roughened.)

The invention has been described in detail with particular reference to preferred embodiments thereof, but it will be understood that variations and modifications can be effected within the spirit and scope of the invention.

What is claimed is:

1. A rear projection screen comprising a sheet of polymeric material, said sheet
    a. consisting essentially of polypropylene having a melt flow rate of at most about 90,
    b. having a thickness of from about 20 to about 80 mils,
    c. having two surface layers containing relatively smaller crystalline spherulites and a core layer containing relatively larger crystalline spherulites; the diameter of the larger crystals in said core layer being between about 15 and about 45 microns and said core layer being at least three-fourths as thick as said sheet; said sheet containing at least about 60 weight percent of crystalline spherulites having average diameters of from about 5 to about 20 microns.

2. A rear projection screen as in claim 1, wherein said sheet has one randomly roughened surface; the roughness of said roughened surface being from about 10 to about 25 microinches.

* * * * *